United States Patent Office 2,824,787
Patented Feb. 25, 1958

2,824,787

MANUFACTURE OF BORON NITRIDE

Frank H. May and Vladimir V. Levasheff, Whittier, Calif., assignors to American Potash & Chemical Corporation, a corporation of Delaware No Drawing. Application June 22, 1955
Serial No. 517,352

9 Claims. (Cl. 23—191)

This invention relates to the high temperature vapor phase reactions which occur between borate esters such as methyl and ethyl borate and ammonia, and particularly to the production of certain novel and desirable products which can be produced by such reactions.

We have found that a gas phase mixture of methyl borate and ammonia in which the ammonia is present in a mole to mole ratio, or in slight excess thereover, will react at furnace temperatures above about 850° C. to yield a heat stable, white, finely dispersed solid product having the following average analysis:

|   | Percent |
|---|---|
| B | 27–32 |
| N | 26–34 |
| H | 2.5–3.0 |
| C | 0.7–1.0 |
| O (diff.) | 43.8–30.0 |

If the solid material so produced is thereafter maintained in an ammonia atmosphere at an elevated temperature of 850° C. and higher, it is converted into boron nitride, the conversion being attended usually by a 25–35% loss in weight but without any loss in boron.

We have further found that composition of the heat stable white solid material obtained depends to a great extent on the velocities at which the reactants are allowed to pass through the hot zone, as well as the furnace temperature. Thus, the lower the feed rate of the reactants, at a given furnace temperature of above 850° C., the higher is the boron and nitrogen content of the resultant white, heat stable, solid material.

The practice of the invention will become further apparent from a consideration of the following typical preparations of a heat stable, white solid material having an average boron content of 27–32% and an average nitrogen content of 26–34%.

A tube furnace was heated to about 900° C. while being swept out with ammonia gas. Methyl borate was then introduced into the hot zone at a rate such that a small excess of ammonia over the 1/1 mole ratio of $NH_3$ to $(CH_3O)_3B$ was maintained in the hot reaction zone. An excess of ammonia is a necessary feature of the process for it ensures formation of the white solid material, without any undesirable decomposition. Carbonaceous substances are formed in the hot reaction zone whenever an excess of methyl borate is present. The finely dispersed white solid material, a major porton of which is swept out of the hot reaction zone by the effluent gas stream, is collected by settling out in a suitable container.

The white product of the gaseous reaction is converted to boron nitride with an accompanying 25–35% weight loss by holding the material in the presence of ammonia and at an elevated temperature above 850° C.

The following are examples of the preparation of the heat stable, finely dispersed white solid material, having an average boron content of 27–32% and an average nitrogen content of 26–34%:

*Example I.*—80 grams of methyl borate were fed into an ammonia-swept furnace at about 900° C. over a period of four hours. 6.5 grams of white solid material were recovered from the trap system. An additional 12.8 grams were recovered from the tube furnace. On the basis of boron recovery, as determined by analysis of the products, a 69.3% yield of white solid material was obtained.

*Example II.*—106 grams of methyl borate were fed at the rate of 19 grams per hour into a 900° C. furnace swept with ammonia at the rate of 14–18 grams per hour. 14.0 grams of white solid material were collected from the trap system and an additional 12.0 grams were recovered from the furnace. On the basis of boron obtained, the yield was 71.4%.

*Example III.*—180 grams of methyl borate were fed at 45 grams per hour into a 950° C. furnace swept with ammonia at the rate of 90 grams per hour. 30.2 grams of white solid material were collected from the trap system and an additional 20.5 grams were recovered from the furnace. On the basis of boron obtained, the yield was 71.1%.

*Example IV.*—229 grams of methyl borate were fed at the rate of 101.8 grams per hour into a 1050° C. furnace swept with ammonia at the rate of 140 grams per hour. 39 grams of white solid material were collected from the trap system and an additional 29 grams were recovered from the furnace. On the basis of boron obtained, the yield was 75.0%.

The results of the above are summarized in Table 1:

TABLE 1

*Preparation of heat-stable white solid from methyl borate and ammonia*

| Example No. | I | II | III | IV |
|---|---|---|---|---|
| Furnace Temperature, °C | 900 | 900 | 900 | 1050 |
| Starting material, $(CH_3O)_3B$, grams | 80 | 106 | 180 | 229 |
| Percent B | 10.41 | 10.41 | 10.41 | 10.41 |
| White product, grams | 19.3 | 26.0 | 50.7 | 68 |
| Percent B | 29.9 | 30.3 | 26.3 | 26.3 |
| Percent Yield (boron recovery) | 69.3 | 71.4 | 71.1 | 75.0 |

The product obtained from the reaction of methyl borate and ammonia is thereafter heat treated with ammonia and the results of several of such treatments are given in Table 2. It is to be noted that the higher the temperature and the longer the treatment, the higher is the boron nitride recovery.

TABLE 2

*Heat treatment in $NH_3$ atmosphere*

| Retention Time, Hours | Temp., °C. | Loss in Wt. | Product Analysis | | Boron Nitride Percent (calc. from N) |
|---|---|---|---|---|---|
| | | | Percent B | Percent N | |
| 1 | 950 | 24.4 | 39.6 | 43.0 | 76.2 |
| 1 | 1,075 | 27.1 | 40.6 | 45.9 | 81.4 |
| 3 | 850 | 24.7 | 40.0 | 50.3 | 89.2 |
| 3 | 1,000 | 25.7 | 41.6 | 52.7 | 93.4 |
| 3 | 1,100 | 26.2 | 41.8 | 53.3 | 94.5 |
| 6 | 900 | | 42.9 | 54.4 | 96.4 |

The conversion of the material to BN is a function of time and temperature, as is also shown by the above results. In general, one should utilize a temperature of above about 800° C. and a period of several hours to obtain conversion of the primary product to BN.

In both operations, we have used temperatures as high as 1300° C., being limited in this only by the materials employed in providing the hot zone and the furnace.

The use of the elevated temperatures of 850° C. and higher is apparently essential for if one carries out the vapor phase methyl borate-ammonia reaction at 500° C. furnace temperature, a compact white crystalline material is obtained having the following analysis:

| | Percent |
|---|---|
| B | 9.35 |
| N | 10.75 |
| H | 6.2 |
| C | 17.2 |
| O (diff.) | 56.50 |

This material is quite different from the fluffy, white, heat stable solid produced at furnace temperatures of the order of 850° C. Further, heat treatment at 850° C. or higher in an ammonia atmosphere of the 500° C. white crystalline product results in its sublimation from the reaction zone without apparent alteration.

In another test of the vapor phase methyl borate-ammonia reaction, at about 750° C. furnace temperature, a mixture of the heat stable, white, finely dispersed solid and of the compact crystalline material was obtained. This mixture had the following average composition:

| | Percent |
|---|---|
| B | 18.35 |
| N | 14.1 |
| H | 5.0 |
| C | 4.7 |
| O (diff.) | 57.35 |

When this mixture was held at a temperature above 850° C. in an ammonia atmosphere, there occurred partial decomposition, as indicated by a darkening of color of the product, partial sublimation, and a 55% loss in weight, as compared to the 25-35% loss in weight obtained during the heat treatment of material from the above 850° C. furnace temperature runs.

Instead of methyl borate, one can use any other borate ester, the reaction being as follows:

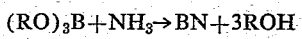

$$(RO)_3B + NH_3 \rightarrow BN + 3ROH$$

where ROH is any alcohol. The following examples further illustrate the practice of this invention.

*Example V.*—A quantity of 22 grams of ethyl borate was fed at 25 grams per hour into a 950° C. tube furnace swept with ammonia at the rate of 115 grams/hour.

A quantity of brownish colored solid material was collected from the trap system and the tube furnace. Infra-red spectrum analysis of the solids produced a curve essentially similar to the ones obtained on the white solid material prepared from the methyl borate-ammonia vapor phase reaction.

*Example VI.*—A quantity of 0.473 gram of the above mentioned brownish solid material was further treated at 950° C. in an ammonia atmosphere. 0.242 gram of whitish solid material was obtained upon completion of the heat treatment, indicating a 51% loss in weight. Infra-red analysis of the heat treated solids showed a typical spectrum of boron nitride.

We claim:

1. In a process for producing boron nitride the steps of producing a boron complex comprising reacting ammonia and methyl borate at a temperature above about 850° C., the ammonia being present in at least a slight excess over a mole to mole ratio with methyl borate, and recovering the product of reaction.

2. A process for producing boron nitride, the steps comprising reacting ammonia and methyl borate at a temperature above about 850° C., the ammonia being present in at least a slight excess over a mole to mole ratio with methyl borate, recovering the product of reaction, and passing ammonia over said recovered product of reaction at a temperature above about 800° C. to produce boron nitride.

3. In a process for producing boron nitride the steps of producing a boron complex comprising reacting ammonia with ethyl borate at a temperature above about 850° C., the ammonia being present in at least a slight excess over a mole to mole ratio with ethyl borate, and recovering the product of reaction.

4. In a process for producing boron nitride the steps of producing a boron complex comprising reacting ammonia and a lower alkyl borate ester at a temperature above about 850° C., the ammonia being present in at least a slight excess over a mole to mole ratio with the borate ester, and recovering the product of reaction.

5. A process for producing boron nitride, the steps comprising reacting ammonia and ethyl borate at a temperature above about 850° C., the ammonia being present in at least a slight excess over a mole to mole ratio with ethyl borate, recovering the product of reaction, and passing ammonia over said recovered product of reaction at a temperature above about 800° C. to produce boron nitride.

6. A process for producing boron nitride, the steps comprising reacting ammonia and a lower alkyl borate ester at a temperature above about 850° C., the ammonia being present in at least a slight excess over a mole to mole ratio with the borate ester, recovering the product of reaction, and passing ammonia over said recovered product of reaction at a temperature above about 800° C. for several hours to produce boron nitride.

7. A process for producing boron nitride, the steps comprising reacting ammonia and methyl borate at a temperature above about 850° C., the ammonia being present in at least a slight excess over a mole to mole ratio with methyl borate, recovering the product of reaction, and passing ammonia over said recovered product of reaction at a temperature above about 800° C. for several hours to produce boron nitride.

8. A process for producing boron nitride, the steps comprising reacting ammonia and ethyl borate at a temperature above about 850° C., the ammonia being present in at least a slight excess over a mole to mole ratio with ethyl borate, recovering the product of reaction, and passing ammonia over said recovered product of reaction at a temperature above about 800° C. for several hours to produce boron nitride.

9. A process for producing boron nitride, the steps comprising reacting ammonia and a lower alkyl borate ester at a temperature above about 850° C., the ammonia being present in at least a slight excess over a mole to mole ratio with the borate ester, recovering the product of reaction, and passing ammonia over said recovered product of reaction at a temperature above about 800° C. for several hours to produce boron nitride.

References Cited in the file of this patent

UNITED STATES PATENTS

| 1,077,712 | Heyder | Nov. 4, 1913 |
| 2,494,968 | Schlesinger et al. | Jan. 17, 1950 |
| 2,606,815 | Sowa | Aug. 12, 1952 |

OTHER REFERENCES

Finlay et al.: "Boron Nitride Unusual Refractory," American Ceramic Society Bulletin, vol. 31, No. 4, pages 141 to 143.

Pease: "Crystal Structure of Boron Nitride," Chem. Abstracts 44, 7116[2] (Nature 165, 722–3 (1950)).

Mellor: "Treatise on Inorganic and Theoretical Chemistry" (1928), vol. 8, pages 108, 109.